(12) United States Patent
Wan

(10) Patent No.: US 7,974,517 B2
(45) Date of Patent: Jul. 5, 2011

(54) DETERMINATION OF DECODING INFORMATION

(75) Inventor: Wade K. Wan, Orange, CA (US)

(73) Assignee: Broadcom Corporation, Irvine, CA (US)

(*) Notice: Subject to any disclaimer, the term of this patent is extended or adjusted under 35 U.S.C. 154(b) by 1579 days.

(21) Appl. No.: 11/244,332

(22) Filed: Oct. 5, 2005

(65) Prior Publication Data

US 2007/0076799 A1 Apr. 5, 2007

(51) Int. Cl.
*H04N 9/80* (2006.01)
(52) U.S. Cl. ........................... 386/248; 386/239
(58) Field of Classification Search .............. 386/248
See application file for complete search history.

(56) References Cited

U.S. PATENT DOCUMENTS

| | | | | |
|---|---|---|---|---|
| 5,479,303 A * | 12/1995 | Suzuki et al. | ............... | 360/72.2 |
| 5,602,956 A * | 2/1997 | Suzuki et al. | ............... | 386/346 |
| 5,701,386 A * | 12/1997 | Yoneyama | ............... | 386/109 |
| 5,740,307 A * | 4/1998 | Lane | ............... | 386/343 |
| 5,745,641 A * | 4/1998 | De Haan et al. | ............. | 386/239 |
| 5,832,172 A * | 11/1998 | Jeon | ............... | 386/326 |
| 5,907,366 A * | 5/1999 | Farmer et al. | ............... | 348/478 |
| 5,940,016 A * | 8/1999 | Lee | ............... | 341/67 |
| 6,009,237 A * | 12/1999 | Hirabayashi et al. | ......... | 386/329 |
| 6,011,868 A * | 1/2000 | van den Branden et al. | . | 382/233 |
| 6,028,632 A * | 2/2000 | Siong et al. | ............... | 375/240.01 |
| 6,078,727 A * | 6/2000 | Saeki et al. | ............... | 386/351 |
| 6,253,025 B1* | 6/2001 | Kitamura et al. | ............ | 386/351 |
| 6,308,003 B1* | 10/2001 | Hirabayashi et al. | ......... | 386/351 |
| 6,327,421 B1* | 12/2001 | Tiwari et al. | ............... | 386/326 |
| 6,337,880 B1* | 1/2002 | Cornog et al. | ............... | 375/240.01 |
| 6,501,862 B1* | 12/2002 | Fukuhara et al. | ............. | 382/249 |
| 6,553,150 B1* | 4/2003 | Wee et al. | ............... | 382/243 |
| 6,628,890 B1* | 9/2003 | Yamamoto et al. | ............ | 386/345 |
| 6,754,272 B2* | 6/2004 | Yamada et al. | ........... | 375/240.14 |
| 2001/0007576 A1* | 7/2001 | Lyu | ............... | 375/240.25 |
| 2002/0044760 A1* | 4/2002 | Shirakawa et al. | ............. | 386/65 |
| 2002/0196852 A1* | 12/2002 | Yamada et al. | .......... | 375/240.13 |
| 2003/0021585 A1* | 1/2003 | Wu | ............... | 386/95 |
| 2004/0021593 A1* | 2/2004 | Park et al. | ............... | 341/67 |
| 2005/0135783 A1* | 6/2005 | Crinon | ............... | 386/68 |
| 2006/0029367 A1* | 2/2006 | Kosugi et al. | ............... | 386/69 |
| 2007/0076799 A1* | 4/2007 | Wan | ............... | 375/240.25 |
| 2008/0118226 A1* | 5/2008 | Kim | ............... | 386/109 |

OTHER PUBLICATIONS

"MPEG-2 Video Specification, ISO/IEC, 13818-2: 1995 (E), Recommendation ITU T H.262 (1995 E)", 1995, 238 pages.
"Draft of Version 4 of H.264/AVC (ITU-T Recommendation H.264 and ISO/IEC 14496-10 (MPEG-4 part 10) Advanced Video Coding)", 14th Meeting: Hong Kong, CH 18-21, Jan. 2005, 315 pages.

* cited by examiner

*Primary Examiner* — Sath V Perungavoor
(74) *Attorney, Agent, or Firm* — Brake Hughes Bellermann LLP

(57) ABSTRACT

Systems, methods, and computer program products are described to determine and present proper decoding information to ensure correct decoding in digital video recording applications, and in other applications. For example, decoding and display of certain video units in a compressed bitstream may require the correct header information corresponding to the video unit to be also presented to a decoder along with the video unit. Since, however, the location of the corresponding header information in the compressed bitstream may not be adjacent to the video unit, the described header locating systems, methods, and computer program products may be used not only to index the header information in a bitstream, but also to determine when and what header information needs to be presented to the decoder.

19 Claims, 7 Drawing Sheets

DETERMINATION OF DECODING INFORMATION

TECHNICAL FIELD

This description relates to decoding compressed digital media.

BACKGROUND

Digital content, including, for example, audio and/or video streams, may be transmitted for reception, use, and enjoyment by a receiving user. For example, television shows, movies, or other recordings may be transmitted across a computer network, or broadcast over the air, or transmitted by way of cable and/or satellite systems. In so doing, the digital content may be encoded, compressed, and/or modified, in order, for example, to conserve bandwidths in the various transmission schemes, and/or to speed the transmission of the audio and/or video streams.

After being encoded and transmitted, the digital content may be received by a user and decoded for use and enjoyment thereof, as just referenced. For example, a decoder may be associated with a television or associated set-top box of some sort, so that the encoded, compressed audio-video streams may be decoded and passed to the television (or other display) for presentation to the user.

Further, techniques exist for allowing the user to manipulate the audio-video streams in a desired fashion, in order to increase a convenience or enjoyment of the user. For example, digital video recorders may be used to record at least a portion of the received audio-video stream, at least temporarily, and may thereby make the recorded portion available to the user for operations such as, for example, pausing, re-winding, fast-forwarding, or other manipulations thereof.

SUMMARY

According to one general aspect, a portion of a bitstream is identified, the portion being provided within the bitstream and separately from associated decoding information. The decoding information that is associated with the portion is determined, and the portion and the decoding information are provided to a decoder.

According to another general aspect, a system includes an index that is operable to associate an identifier with a location of decoding information, where the decoding information is related to decoding of a portion of a bitstream. A determination system is operable to analyze the portion of the bitstream to determine the identifier, and is further operable to access the index to determine the location of the decoding information, based on the identifier. A presentation system is operable to provide the portion and the decoding information to a decoder.

According to another general aspect, an apparatus includes a storage medium having instructions stored thereon. The instructions include a first code segment for accessing content from within a bitstream, a second code segment for determining decoding information associated with the content, the decoding information being located separately from the content, and a third code segment for presenting the decoding information to a decoder for use in decoding the content.

The details of one or more implementations are set forth in the accompanying drawings and the description below. Other features will be apparent from the description and drawings, and from the claims.

DETAILED DESCRIPTION

Figure 1:
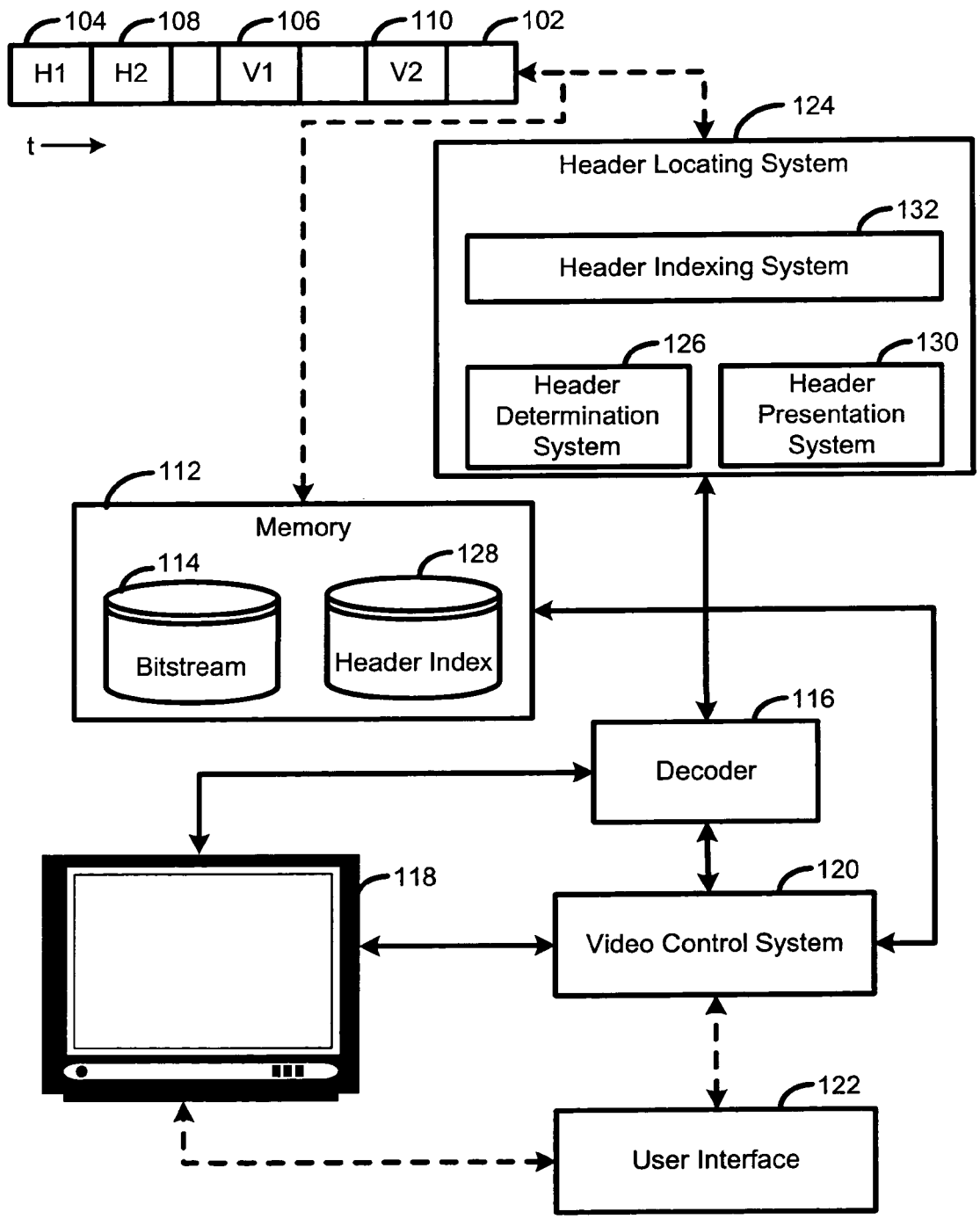
FIG. 1 is a block diagram of a system for providing digital content.

FIG. 1 is a block diagram of a system 100 for providing digital content. For example, the system 100 may receive a request, e.g., from a user, for certain audio/video data within a transmitted data stream (and/or within a stored data file). The system 100 may then determine decoding information that may be used in a decoding and/or decoding-related processing of the stream or file, for presentation to the user. Such decoding information may include, for example, header information, display information, enhancement information, and/or usability information. In this way, the requested audio/video data may be presented to a user in a fast, efficient, and reliable manner.

In FIG. 1, then, an encoded, compressed bitstream 102 represents transmitted and/or stored data that may include, for example, information related to television shows, movies, songs, radio programs, still pictures, text, websites, animation, or any other information that may be transmitted and/or stored for the use and enjoyment of a receiving user, including, for example, pay-per-view and/or video-on-demand movies or other programming. The bitstream 102 may represent a coded or encoded bitstream, where, for example, analog video may have been converted into digital video, according to some pre-defined or known conversion process (or where digital content of one format has been converted into digital content of another format). The bitstream 102 also may be secured, for example, in order to provide secure transmission of the bitstream 102, and/or in order to allow validation/authorization of a receiving user. As such, the bitstream 102 may be compressed. For example, the bitstream 102 may have been analyzed to remove or reduce redundancies or other data that is considered more or less extraneous for a given purpose. Such compression allows, for example, conservation of bandwidth associated with transmission of the bitstream 102, as well as efficient use of any memory associated with storage of the bitstream 102. By way of example and not limitation, then, coding/decoding standards (also referred to as codecs) that may be used in the various processes described herein may include various versions of the Moving Pictures Experts Group (MPEG) standard (e.g., MPEG-1, MPEG-2, and/or MPEG-4), Quicktime, audio-video interleave (.avi), Ogg (.ogg), True Audio (.tta), and/or the H.264 compression algorithm (also known as H.264, and/or MPEG-4 Part 10/Advanced Video Coding (AVC), and/or "the JVT codec," where the latter nomenclature refers to the Joint Video Team involved with creation of this codec).

Accordingly, portions of the bitstream 102 may undergo decoding and/or decoding-related processing, in order to decode the portions of the bitstream 102 and output content therein in a desired form that may ultimately be provided to a suitable output channel or device for output thereof, in either digital or analog format. In this context, various types of decoding information may be used to decode and/or present content of the bitstream 102 in a desired form and manner. One example of such decoding information includes header information that is included in the bitstream 102, where the header information may specify, for example, information about associated audio/video units within the bitstream 102, and/or about the encoding/compression/security techniques used with respect to the bitstream 102.

For example, in FIG. 1, the bitstream 102 is illustrated as including a header 104 that is associated with a video unit 106, as well as a header 108 that is associated with a video unit 110. That is, as just explained, the header 104 may contain information useful (or possibly required) in decoding or otherwise processing the video unit 106, while the header 108 may be used to decode the video unit 110. Of course, the bitstream 102 should be considered to contain many other headers, video units, or other information/content/portions, as would be apparent, but which are not illustrated here for the sake of clarity. Further, it should be understood that other information besides the header information may be necessary or useful in decoding the bitstream 102, such as, for example, general information about the codec standard(s) used to encode the bitstream 102, and/or information related to a display, enhancement, and/or usability of portions and/or content of the bitstream 102, as discussed in more detail below.

Additionally, the term video unit is intended merely as an example of any grouping, designation, naming, or other indication of virtually any (type of) audio and/or video data, or other data, that may be included within the bitstream 102. As such, it should be understood that the term video unit may include, encompass, and/or be replaced with, for example, a portion of an image, an image slice, a single image/picture, a sequence of images, a grouping of images, an audio stream or file, a sequence or grouping of audio files, or virtually any other type of audio-visual data. Thus, comments made with respect to video units should generally be considered to be applicable to audio files, as well, and the term audio/video and/or audio-video should be understood to represent any of audio alone, video alone, or audio and video together. Moreover, it should be understood that portions or content of the bitstream 102 may include virtually any type of information that may be encoded/decoded for presentation to a user, including text, and that the bitstream 102 itself should be considered to represent, in some examples, more than one bitstream, where portions or content of the plurality of bitstreams may be related to one another (e.g., where video content is included in the bitstream 102, and closed-captioning for the video content is included in a second bitstream, or is otherwise transmitted or stored).

As illustrated in FIG. 1, the headers 104 and 108 need not be adjacent to their respective video units 106 and 110 within the bitstream 102. For example, assuming that time "t" runs from left to right along the bitstream 102, as shown, it may be seen that the headers 104 and 106 both precede their respective video units 106 and 108 in time, and are non-adjacent thereto within the bitstream 102.

Of course, it is also possible that a given header may be adjacent to its associated video unit, and, in fact, certain coding/decoding standards may require that at least some headers are adjacent to their associated video units (or other associated data) within a bitstream. In the example of FIG. 1, however, it is assumed that the headers 104 and 108 are provided separately from their respective video units 106 and 110, which may be the case, for example, where the relevant coding technique used to encode/compress the bitstream 102 uses such separation(s) of headers from video units, for example, as part of a specific compression technique. For example, if a header contains information that is specific to a number of subsequent video units, the coding standard may determine that it would be redundant to include a separate header for each of the subsequent video units, and, instead, may use just the one header to precede, and provide needed information for, each of the subsequent video units.

Thus, the bitstream 102 may be received at a memory 112, and stored within a local bitstream memory 114. For example, the memory 112 may be internal to a device or system for providing media output, such as, for example, a digital video recorder, a personal video recorder, a general-purpose computing device, a television, or virtually any other computing device that may be used to provide audio, visual, and/or other media output. In one specific implementation, then, the memory 112 may represent an internal hard disk drive (HDD) of a digital video recorder. Of course, such examples are for illustration only, and do not imply any limitation. For example, the memory 112 may be external to a device or system for providing media output, and may be accessed over a network. For example, the digital video recorder just mentioned may access the memory 112 over a network.

In such media systems as just referenced, and in others, the bitstream memory 114 may thus provide the bitstream 102 to a decoder 116, so that content of the bitstream 102 may be decoded and presented to a user by way of, for example, a display 118, which may be, for example, a television, computer monitor, portable display, or virtually any other type of display. In this regard, the decoder 116 may perform any necessary or desired decoding or decoding-related processing associated with providing the information within the bitstream 102 to the user. For example, the decoder 116 may perform decompression of the encoded bitstream 102, digital-to-analog conversion of the decompressed content, and/or other modifications designed to supplement or enhance a display or other use of the content. For example, the decoder 116 may process the content of the bitstream 102 such that user information (e.g., closed-captioning) may be associated with corresponding content of the bitstream 102.

During such processing, as long as the decoder 116 receives the bitstream 102 from the bitstream memory 114 in an order or sequence that matches the original order or sequence within the transmitted bitstream 102, the decoder 116 may have access to the necessary information for decoding a particular video unit. For example, if the decoder 116 receives the header 104 before the video unit 106, it may be inconsequential that the header 108 (and/or other information) is included in between the header 104 and its video unit 106, since the decoder 116 may be aware of, and access, the necessary header information (e.g., the header 104) during a decoding of the video unit 106. Thus, in such scenarios, the advantages referenced above and associated with separation of the header 104 from the video unit 106 (e.g., improved compression) may be obtained, without substantially affecting a decoding of desired video unit(s).

In other implementations, however, it may be the case that the decoder 116 may not receive portions of the bitstream 102 in an order that matches an original transmission or encoding of the bitstream 102. For example, selection and use of desired portions of the bitstream 102 from within the bitstream memory 114 may be performed, among other functions, by a video control system 120, perhaps at the direction of a user (not shown) by way of a user interface 122. The user interface 122 may include, for example, an interface executed in conjunction with a remote control device, and/or a set of options presented to the user by way of the display 118 or another display, or virtually any other technique for obtaining input from the user.

Thus, for example, in the case where at least the memory 112, the decoder 116, and the video control system 120 are part of a digital video recording system, the user may request that the digital video recording system provide functionality that includes rewinding, fast-forwarding, pausing, skipping through, or otherwise manipulating an order or sequence of the bitstream 102. Such functionality may be referred to as a "trick mode" operation, and allows users to use and experience audio/video content in useful and convenient ways.

Thus, in FIG. 1, the user may use the user interface 122 to direct the video control system 120 to obtain a particular video unit from the bitstream 102 stored within the bitstream memory 114. For example, the user may wish to skip ahead in a television program by a certain predetermined amount, or may wish to begin a re-wind process of a television program. In these and other examples, a corresponding video unit(s) from within the bitstream 102 may be selected from the bitstream memory 114 for presentation to the decoder 116, so as to provide the desired process or effect. For example, locations of video units within the bitstream 102, such as the video units 106 and 110, may be indexed during either the recording and/or playback of the bitstream 102, in order to enable quick random access to those video units.

As a result, as referenced above, a video unit may be requested and/or presented in a more or less random order, or, at least, in an order or sequence that does not match the order in which that video unit was originally included within the bitstream 102 (and as stored within the bitstream memory 114). For example, the user may request the video unit 106 by skipping ahead to the video unit 106 from an earlier video unit (not shown) that precedes the header 104.

In this case, in order to avoid a situation in which the decoder 116 is not provided with the header 104 either before or concurrently with the video unit 106, a header locating system 124 is provided that is operable to locate the correct header information. For example, the header locating system 124 may include a header determination system 126 that receives a request from the video control system 120 for a particular video unit (e.g., the video unit 106), analyzes the request and/or the requested video unit, and then accesses a header index 128 in order to locate an associated header (e.g., the header 104) within the bitstream 102, e.g., within the bitstream memory 114. Then, a header presentation system 130 may present the resulting header information to the decoder 116 (e.g., may transmit the header 104 to the decoder 116 or activate the header 104 within the decoder 116).

For example, the header index 128 may store an address (es) of the various headers within the bitstream 102 and/or the bitstream memory 114 using a linklist or other appropriate data structure, as would be apparent. For example, the header index 128 may store an identifier of each header, along with a memory address of each header within the bitstream memory 114. When the header determination system 126 receives a request for a particular video unit, the header determination system 126 may analyze the video unit to determine an identity of the header associated with that video unit.

For example, after receiving a request for the video unit 106, the header determination system 126 may analyze the video unit 106 to determine its associated header, e.g., here, the header 104. Then, the header determination system 126 may access the header index 128 to find a byte address of the header 104 within the bitstream memory 114, as well as a size (length) of the header, so that the header 104 may be retrieved from the bitstream memory 114 and provided to the decoder 116, along with the video unit 106, for decoding and ultimate provision thereof to the video control system 120 and/or the display 118. Of course, the use of a linklist to store/access the header information is but one example, and other techniques may be used.

The header index 128 may be provided to, or otherwise available to, the memory 112 and/or the video control system 120, in a number of different manners. For example, a header indexing system 132 may be associated with the header locating system 124 (as shown in the example of FIG. 1) and may be operable to receive the bitstream 102 for indexing of any header information contained therein. The header indexing system 132 may operate, for example, during a recording and/or playback operation of the video control system 120.

For example, in a digital video recording application or system, the bitstream memory 114 may include a buffer of pre-determined length (e.g., thirty minutes or some other defined time period) that stores a corresponding amount of the bitstream 102. In this way, the user may continually have access to (up to) a most-recent thirty minutes of whatever television program is being watched. In such an example, the header indexing system 132 may continually index header information and provide the header index 128 with sufficient header location information to track an amount of the bitstream 102 buffered within the bitstream memory 114, as the bitstream 102 is buffered.

In other examples, however, indexing of the header information within the bitstream 102 may occur prior to (or concurrently with) transmission of the bitstream 102, and may be pre-stored within the header index 128, and/or may be obtained after receipt of the bitstream 102. In these and other examples, the header indexing system 132, or an analogous system, need not be included within the header locating system 124, and/or may be located/operated remotely from the header locating system 124. Somewhat similarly, it should be understood that the illustrated location of the header index 128 within the memory 112 is for example only, and that the header index 128 may be stored separately from the bitstream memory 114, e.g., within the header locating system 132, or remote from some or all of the remaining elements of the system 100.

As described herein, then, the local availability of the bitstream 102 during playback thereof allows user(s) to pause, fast-forward, rewind, and otherwise manipulate audio-video content. For example, as described, trick modes require the decoding and display of pictures in a different ordering than the order they are coded in the (original) bitstream 102. To enable this, applications such as, for example, digital video recorder applications, index the location in the compressed bitstream of video units during either the recording or playback phase, in order to enable quick random access to these video units. Decoding and display of certain video units may require the header information corresponding to the video units to be presented to the decoder 116 along with the video unit. However, as illustrated, the location of header information in the compressed bitstream may be provided separately from the corresponding video unit. Thus, the system 100 may be operable to index the header information in the bitstream 102 within the header index 128, as well as to determine therefrom when and what header information needs to be presented to the decoder 116 from the bitstream memory 114.

As referenced above, the example of FIG. 1 is primarily presented with reference to header information, and to various techniques for locating and presenting header information within/from the bitstream 102, in association with related portions of the bitstream 102. It should be understood, however, that other decoding information that is related to portion(s) of the bitstream 102 besides header information may be indexed, located, and/or provided to the decoder 116, and that any such decoding information may be provided separately from an associated portion(s) of the bitstream, e.g., may be located outside of the bitstream 102.

For example, display information may be provided that the decoder 116 may use to render the content of the bitstream 102 in a desired form for output. For example, the decoder 116 may use such display information to supplement or enhance a presentation of the content of the bitstream 102. Although the example of closed-captioning is provided above, it should be understood that many other examples may exist. For example, the AVC standard includes a class of decoding information known as Supplemental Enhancement Information (SEI), which may be included in a Network Abstraction Layer (NAL) when the bitstream 102 is encoded/decoded according to the AVC standard. Other standards, e.g., the MPEG-2 standard, may use such SEI, and/or may use similar techniques to improve an enjoyment or use of the content of the bitstream 102. Such decoding information may be used, for example, to mark a scene change within a video stream (e.g., a "fade-out" that occurs between scenes), or may include buffer management information for managing a buffer in which the bitstream 102 may temporarily be stored (e.g., the bitstream memory 114).

As referenced above, such display information may be included within the bitstream 102, or may be provided separately, e.g., may be obtained from another location (such as another, out-of-band channel from the bitstream 102), and may include any information that may be matched with a particular image (or image portion, or other content of the bitstream 102) in order to perform desired decoding and/or decoding-related processing. For example, the display information may include supplemental content that provides contextual information to a particular portion of the bitstream 102, such as a stock quote or weather information that is provided in conjunction with a particular image of a company or location.

Moreover, as should be apparent from the above discussion of FIG. 1, such decoding information may be within the header information, or associated with the header information, or separate from the header information. For example, again referring to the AVC standard, Video Usability Information (VUI) may be included as part of a header and may or may not be used by the decoder 116 to provide a desired display or display characteristic. For example, VUI or other types of decoding information may be used to determine a color space of video content in the bitstream 102 for proper presentation of colors on a particular display device, or to determine an aspect ratio and/or timing of pictures of the video content.

Accordingly, it should be understood that the example of the system 100 of FIG. 1, although illustrated and discussed primarily with respect to header information, may operate in the same or similar manner with respect to other types of decoding information. For example, where the decoding information includes SEI, VUI, or other types of decoding information, the header locating system 124 may be considered to represent a system for locating decoding information in general, so that, in this example(s), the systems 132, 126, and 130 may be considered to represent indexing, determination, and presentation systems, respectively, for the decoding information. Accordingly, the header index 128 may be considered to be an index for decoding information in general, i.e., may index header information and/or other types of decoding information. Similarly, to the extent that FIGS. 2-7 are illustrated and discussed with respect to header information as an example of decoding information, it should be understood that similar comments regarding the extension of the examples of FIGS. 2-7 to other types of decoding information will also apply.

Figure 2:
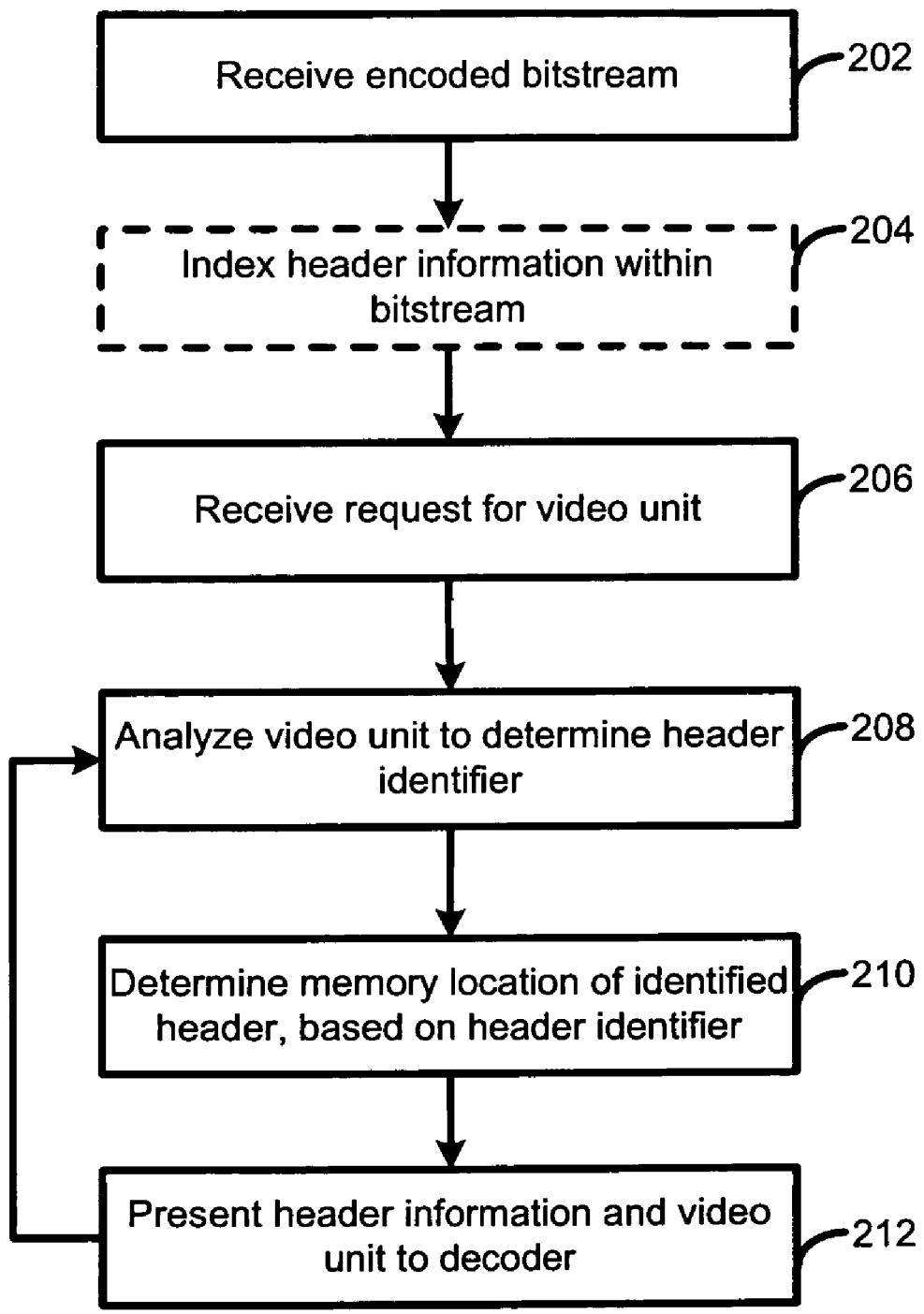
FIG. 2 is a flowchart illustrating techniques for using the system of FIG. 1.

FIG. 2 is a flowchart or process 200 illustrating techniques for using the system 100 of FIG. 1. In FIG. 1, an encoded bitstream is received (202). For example, the bitstream 102 may be received at an appropriate input module that may be associated with a digital video recorder or other device that may be implemented using the system 100 of FIG. 1. The bitstream 102 may then be provided either to the header locating system 124 and/or the memory 112 of FIG. 1. As described, the bitstream 102 generally includes header information (e.g., the headers 104 and 108) and associated content or portions of the bitstream 102, e.g., video units, that are referenced by the header information (e.g., the video units 106 and 110, respectively).

The header information within the received bitstream may then be indexed (204). For example, the header indexing system 132 may be used to associate a header identifier of each header with a memory address at which the corresponding header is stored. In the example of FIG. 1, the header indexing system 132 may be operable to store a header identifier for each of the headers 104 and 108, in association with the respective memory addresses of the headers 104 and 108 within the bitstream memory 114, within the header index 128.

As referenced above, however, it should be understood that such header indexing/locating information already may be accessible (e.g., may be stored before receipt of the bitstream 102), or may not be required until later in a given process (e.g., after a request for an associated audio-video stream has been received). In these examples, then, header indexing may be omitted as part of the process, or may be performed at an appropriate (earlier or later) time.

Further in FIG. 2, a request for a video unit is received (206). For example, as referenced above, a user may execute a command to rewind, fast-forward, skip through portions of, or otherwise manipulate content of the bitstream memory 114. To provide the requested functionality, the video control system 120 may request a particular video unit or sequence of video units from the bitstream memory 114. For example, the video control system 120 may receive and/or forward a request for the video unit 106 from within the bitstream 102.

The video unit may be analyzed to determine an identifier associated with a header of the video unit (208). For example, in the case where the video unit 106 is requested, the header determination system 126 may analyze the video unit 106, and/or information about the video unit 106. The video unit 106 may include, or otherwise be associated with, a header identifier that specifies a name or other information or designation related to the header 104.

A memory location of an identified header may then be determined, based at least on the header identifier (210). For example, as referenced above, a linklist or other appropriate data structure may be used to construct the header index 128 such that desired header identifiers are associated with a memory address within the bitstream memory 114 at which the corresponding header is stored. Thus, if the header determination system 126 receives a request for the video unit 106, then the header determination system 126 may determine a header identifier for the header 104 within the video unit 106, and, based thereon, may access the header index 128 to determine a memory location of the identifier header (i.e., the header 104) within the bitstream memory 114.

Accordingly, the header presentation system 130 may access the desired header from memory, and present the header to the decoder 116 (212). For example, the header presentation system 130 may present the header 104 to the decoder 116 from the memory 114, so that the decoder 116 has access both to the header 104 and the video unit 106, and may therefore decode the video unit 106 appropriately.

Thereafter, the process 200 may continue with an analysis of a next video unit for determination of, and access to, a corresponding header (208). For example, once the video unit 106 has been decoded (and/or displayed), the bitstream 102 may thereafter be played in an order of its original encoding. Thus, for example, the video unit 110 may be presented to the decoder 116. Since, as shown in FIG. 1, the corresponding header 108 occurs earlier in the bitstream 102 than both the video unit 126 and the video unit 110, the header locating system 124 may be used, as in the examples above, in order to determine, locate, and present appropriate header information (here, the header 108) to the decoder 116.

As seen in this example, then, it is not necessary for the video control system 120 and/or the header locating system 124 to receive a user request for a given video unit. Rather, any type of manual and/or automated designation of a given video unit may be necessary or sufficient to begin a header locating and/or decoding process for that video unit.

Additionally, it should be understood that FIG. 2 is generally intended to illustrate example operations of the system 100 at a conceptual level. Thus, although the process 200 may be used to operate the system 100, it should be understood that various modifications, alterations, and additions may be made to the process 200 in order to execute a particular implementation of the system 100. For example, elements of the process 200 may be omitted, or may be performed in a different order from that which is illustrated, and other elements may be included that are not specifically illustrated in FIG. 2.

As another example, changes may be made to the process 200 in order to make the process 200 more efficient or practical to execute. For instance, the process 200 may be modified to take advantage of certain structures or features that may be present with respect to the bitstream 102, the video control system 120, or other elements of the system 100. For example, in a case where header information does not change in between (at least) two consecutive video units, the system 100 may execute an implementation of the process 200 in which the header information is sent to the decoder 116 only once for the two video units, and additional header information is only sent thereafter when the system 100 determines that new header information is available and/or required. In this way, and in other ways, the system 100 may be optimized to increase a speed, efficiency, and reliability of operation.

Figure 3:
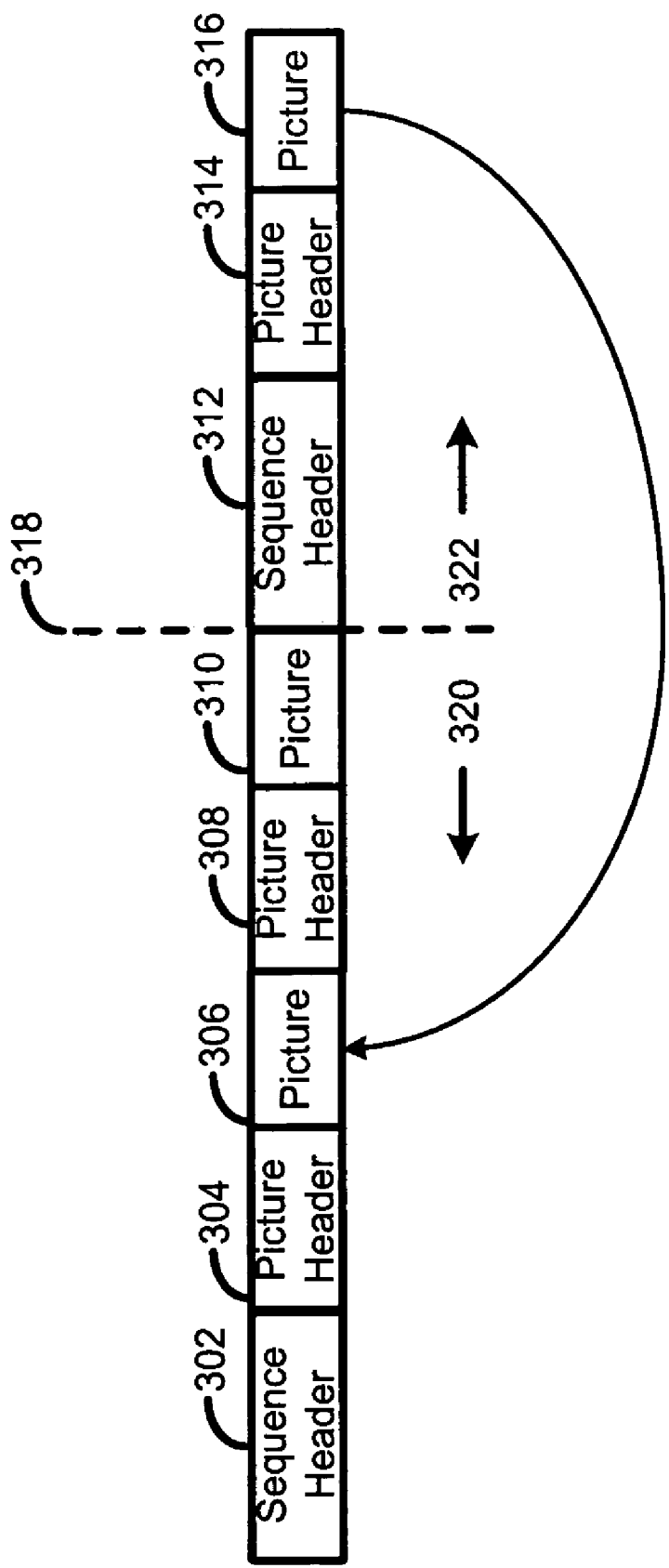
FIG. 3 is a block diagram of a compressed video bitstream that may be used with the system of FIG. 1.

FIG. 3 is a block diagram of a compressed video bitstream 300 that may be used with the system 100 of FIG. 1. The bitstream 300 may be composed, for example, according to the MPEG-2 standard, although the following description may generally be applicable to various other standards, as would be apparent. Moreover, it should be understood that various other types of data (including additional video data, header information, and/or other decoding information) may be included within the bitstream 300, and/or separately from the bitstream 300, in addition to (or alternatively to) that which is illustrated in the example of FIG. 3.

In FIG. 3, a sequence header 302 provides header information for a sequence of following data segments that generally may include a picture header 304, a picture 306, a picture header 308, and a picture 310. The sequence header 302 and the picture headers 304/308 generally illustrate the point that a plurality of types of headers may be included within the bitstream 300, or other bitstreams, where some of the headers may include information related to a plurality of following pictures or other video units, and others of the headers are specific to a particular picture. For example, in FIG. 3, the sequence header 302 may provide information about groups or collections of pictures, which may include some or all of the pictures 306/310, while the picture headers 304 and 308 are specific to, and provide information related to, their respective following pictures 306 and 310.

In the MPEG-2 standard, it may be the case that the picture headers 304 and 308 are required to be adjacent to their respective pictures 306 and 310. As a result, the decoder 116 or other decoder may easily be able to locate a desired picture header, even if an associated picture is selected out of order. On the other hand, the sequence header 302 may apply to both the pictures 306 and 310, and, for that reason and/or due to any intervening picture headers (e.g., the picture header 304), may not be adjacent to a given picture, even if the sequence header 302 includes information that may be useful in the decoding of such a picture.

Further in FIG. 3, a second sequence header 312 precedes a picture header 314 and a picture 316. As a result, for the purposes of the example of FIG. 3, a division 318 defines a first sequence 320 and a second sequence 322, as shown. For example, the sequence 320 may be part of a television program, while the sequence 322 may be part of a television commercial.

As a result, if a user re-winds from the picture 316 to the picture 306, then the header determination system 126 may be used to analyze the picture 306 and determine an identity and location of the sequence header 302 within the header index 128. Then, the header presentation system 130 may present the sequence header 302 to the decoder 116, along with the picture 306, so that decoding of the picture 306 may occur in a fast, efficient, and reliable manner.

In FIG. 3, then, the process of FIG. 2 may be implemented in that the header determination system 126 may receive the request for the picture 306 (206), and may then analyze the picture 306 to determine a header identifier of the sequence header 302 (208) by first determining the associated picture header 304 (which may be straightforward to the extent that the picture header 304 is known to be adjacent to the picture 306), and then by analyzing the picture header 304 to obtain a reference contained therein to the sequence header 302. Then, the header determination system 126 may use this header identifier to determine a memory location of the sequence header 302 (210)

Figure 4:
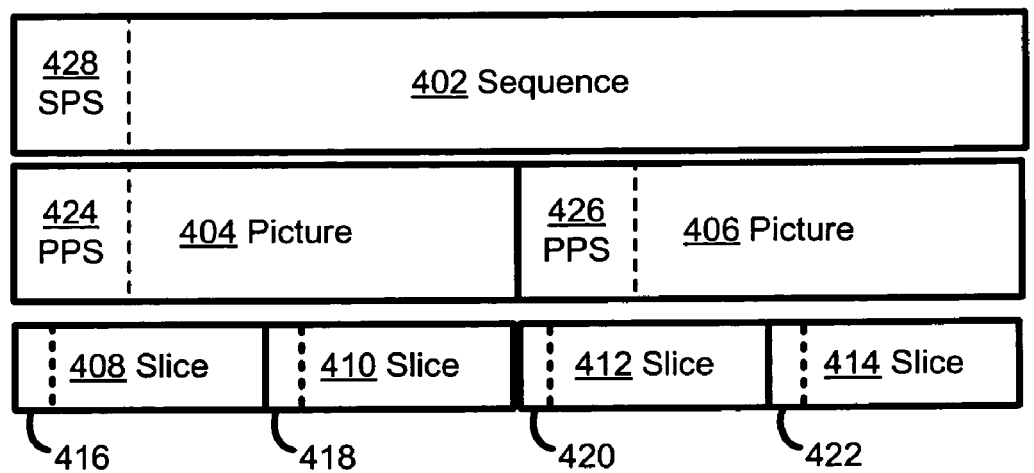
FIG. 4 is a block diagram of an organization scheme used in a compressed video stream that may be used in the system of FIG. 1.

FIG. 4 is a block diagram of an organization scheme 400 used in a compressed video stream that may be used in the system 100 of FIG. 1. For example, the organization scheme may be used in conjunction with the AVC standard referenced above, and which also may be referred to as, for example, H.264 or JVT.

In FIG. 4, a sequence 402 is defined as including one or more pictures, such as, in the example of FIG. 4, pictures 404 and 406. Further, each picture may include one or more slices. In the example of FIG. 4, the picture 404 includes slices 408 and 410, while the picture 406 includes the slice 412 and the slice 414.

Further, header information may be included in various ways within the just-described organization hierarchy. For example, the slices 408, 410, 412, and 414 may be associated with headers 416, 418, 420, and 422, respectively, as shown. Similarly, pictures may be associated with a picture parameter set (PPS), so that, for example, the picture 404 is associated with a PPS 424, while the picture 406 is associated with a PPS 426. A sequence may be associated with a sequence parameter set (SPS), so that, for example, the sequence 402 is associated with a SPS 428. Thus, in the AVC syntax, a sequence such as the sequence 402 is generally composed of one or more pictures (e.g., the pictures 404 and 406), and a picture is composed of one or more slices (e.g., slices 408/410 and 412/414, respectively, as shown).

The decoding of any coded slice may require fields in the corresponding PPS and/or SPS, so that it may be beneficial or necessary to associate the proper PPS and SPS with every corresponding coded slice. The AVC syntax generally specifies that the corresponding PPS and SPS for a coded slice should be available to the decoding process prior to decoding of the coded slice. The AVC syntax does not, however, specify exactly where either of the two types of header information (i.e., SPS and/or PPS) needs to be in the bitstream 102. As a result, the headers may not be transmitted regularly in the bitstream 102 (e.g., a PPS does not need to be transmitted before every picture), and may not be adjacent to the video units to which they correspond (e.g. a SPS may not need to be located immediately next to the video unit it corresponds to, but may only need to be transmitted before the video unit, and, as a result, may be located much earlier in the compressed bitstream).

According to the AVC syntax, the header of each slice may include a field "pic_parameter_id" that indicates the PPS that corresponds to the given slice. Somewhat similarly, in the header of every PPS unit, there may be a field "seq_parameter_id" that indicates the SPS that corresponds to this PPS. As should be understood from the discussion above, and from the examples provided below, these fields may be used as examples of header identifier(s) that allow the header determination unit 126 to, for example, analyze a slice (e.g., the slice 410) and determine a corresponding header (e.g., the header 424 and/or the header 428).

Figure 5:
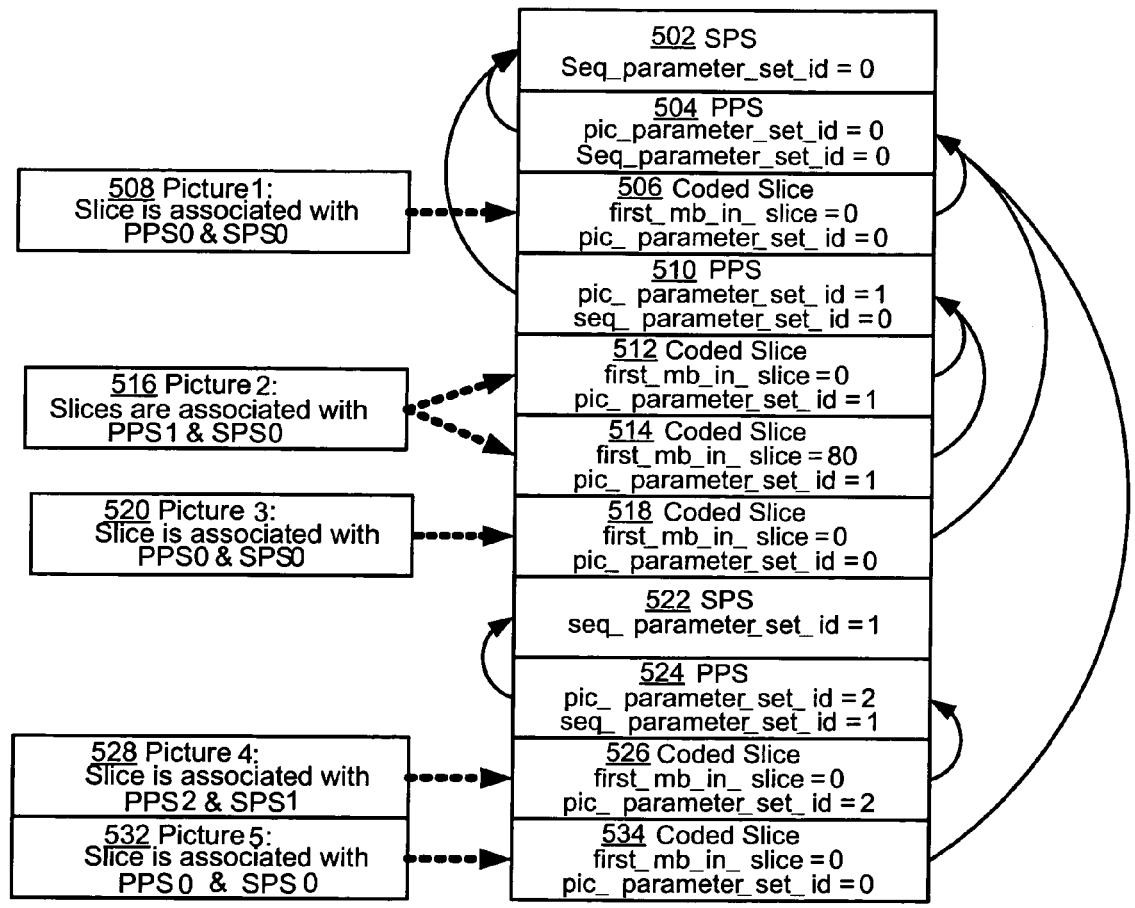
FIG. 5 is a block diagram of a video unit hierarchy of a compressed bitstream associated with the bitstream organization scheme of FIG. 4.

FIG. 5 is a block diagram of a video unit hierarchy of a compressed bitstream 500 associated with the bitstream organization scheme 400 of FIG. 4. In FIG. 5, the illustrated bits are ordered from top to bottom, so that, for example, SPS 502 having seq_parameter_set_id=0 occurs before PPS 504 having pic_parameter_set_id=0 in the compressed bitstream 500.

In the example of FIG. 5, and for clarity and ease of description, it is assumed that the example AVC bitstream 500 is compliant with the Main Profile of the AVC syntax. Since the Main Profile of the AVC standard does not allow arbitrary slice order, the field first_mb_in_slice (i.e., first macroblock in slice), e.g., within a slice 506, may be checked to determine the location of a new picture, since a slice cannot span across pictures. That is, for example, the slice 506 with the field first_mb_in_slice equal to zero indicates a new picture, and a nonzero value indicates another slice in the same picture. However, the header locating system 124 and modifications and/or versions thereof may be used to create and/or access the header index 128 (or similar), even outside of this example(s), e.g., when arbitrary slice order is allowed.

Continuing the example of FIG. 5, a picture 508 includes one coded slice (i.e., the slice 506) that has a pic_parameter_set_id value of 0, and which therefore corresponds to the PPS 504 with a pic_parameter_set_id value of 0. The PPS 504 has a seq_parameter_set_id value of 0, therefore it corresponds to the SPS 502 with seq_parameter_set_id value of 0. By association, then, the coded slice 506 in picture 508 corresponds to the SPS 502 with seq_parameter_set_id value of 0.

In a similar fashion, a corresponding SPS and PPS may be determined for each coded slice. These relationships are illustrated in FIG. 5 by arrows on the left side of the bitstream 500 that indicate how the seq_parameter_set_id field relates a SPS and each PPS, and by the arrows on the right side of the bitstream 500 that indicate how the pic_parameter_set_id field relates a PPS and each coded slice.

Specifically, as shown, a PPS 510 with pic_parameter_set_id=1 and a seq_parameter_set_id=0 is associated with a slice 512 and a slice 514, which in turn are associated with a picture 516 that is therefore associated with the PPS 510 and the SPS 502. A slice 518 is associated with the PPS 504, since both have pic_parameter_set_id=0, and with a picture 520, which therefore also is associated with the PPS 504 and the SPS 502.

Continuing in FIG. 5, a SPS 522 with seq_parameter_set_id=1 is associated with a PPS 524 that is associated with a pic_parameter_set_id=2, which, in turn, is associated with a slice 526 and a picture 528, as shown (such that the picture 528 is associated with pic_parameter_set_id=2 and seq_parameter_set_id=1). Finally in FIG. 5, a slice 532 is associated with the PPS 504 having pic_parameter_set_id=0, which, as already described, is associated with the SPS 502 having seq_parameter_set_id=0 (so that, again, a picture 534 also is related to the SPS 502 and the PPS 504).

As already described, transmission of header information may not occur regularly or periodically, and header information may not be adjacent to the video unit to which the header information corresponds. For example, the picture 516 is associated with the PPS 510. The next picture (i.e., the picture 520) is associated with a different PPS (i.e., the PPS 504). The PPS 504 with pic_parameter_set_id=0 was not transmitted between the picture 516 and the picture 520, but, rather, occurs much earlier in the bitstream 500 (before the picture 516 and the picture 508), which is compliant with the AVC syntax. Thus, the header locating system 124 of FIG. 1, or a corresponding system(s), may be used to index the header information in the bitstream 500 and/or to locate required headers (e.g., the SPS 502, 522 and/or the PPS 504, 510, 524) for decoding a current video unit (e.g., one of the pictures 508, 516, 520, 528, 532).

For example, as described, digital video recorder applications may jump between different portions of the bitstream 500, and may or may not have previously presented the corresponding header information for a video unit to permit proper decoding. As one such instance, a slow rewind may be requested, starting from the picture 528. In this case, the SPS 522 and the PPS 524 for the picture 528 are located immediately before the picture 528 in the bitstream 500, so the SPS 522 and the PPS 524 for the picture 528 must be sent to the decoder 116 before the coded slice 526 of the picture 528. The SPS 502 and PPS 504 for the next picture 520 (going in reverse due to the re-wind operation) are not adjacent to the coded slice 518 of the picture 520, and so the header locating system 124 may be used first to locate the proper headers within the bitstream, using the header index 128, and then to send the headers to the decoder 116 before sending the coded slice 518 of the picture 520.

Figure 6:
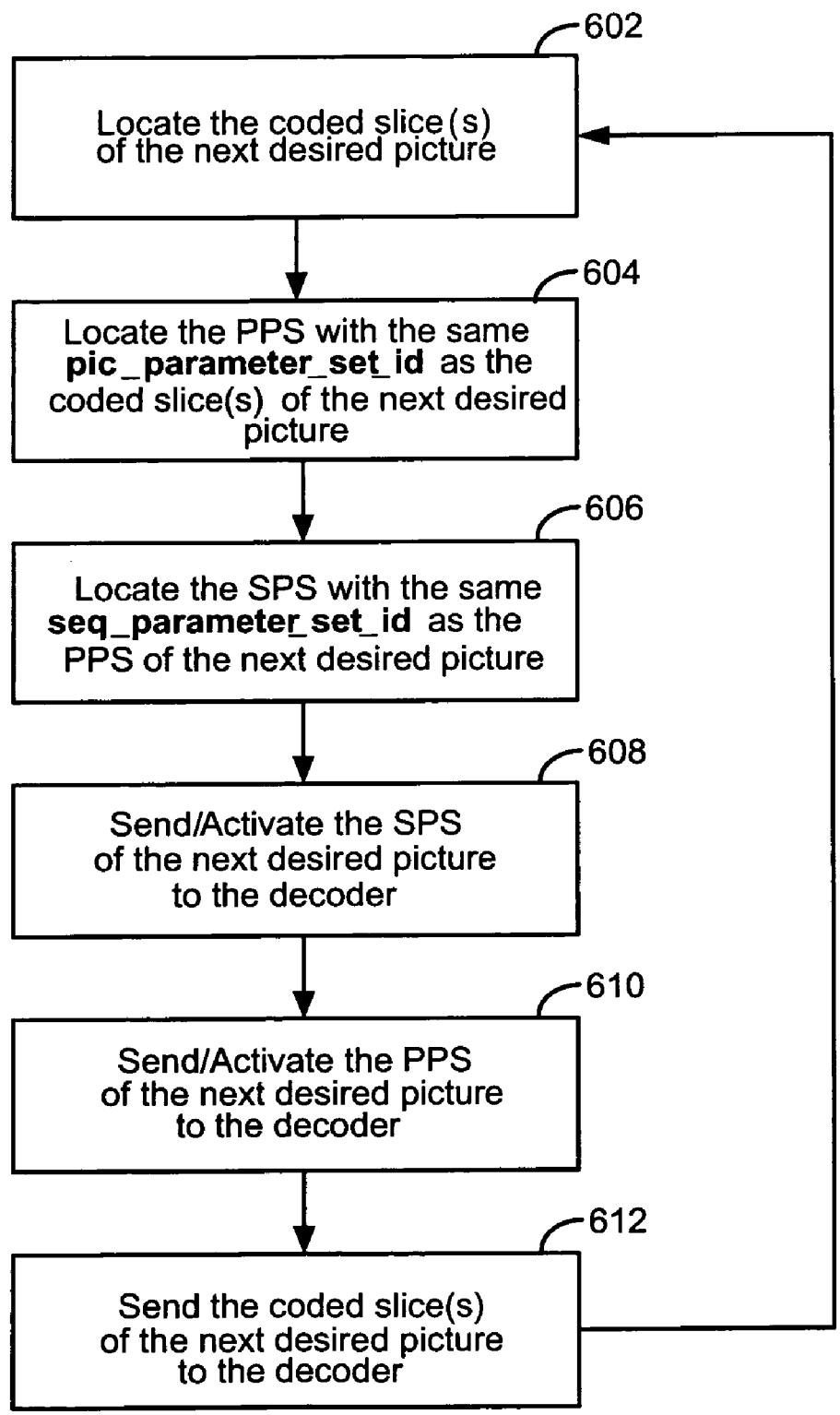
FIG. 6 is a flowchart illustrating a first example technique for using the system 100 of FIG. 1 with respect to the bitstream of FIG. 5.

FIG. 6 is a flowchart 600 illustrating a first example technique for using the system 100 of FIG. 1 with respect to the bitstream 500 of FIG. 5. In FIG. 6, it is assumed that some picture has been designated or determined to be desired, whether by user request, automated process, or by some other technique or occurrence.

Then, the one or more coded slices that compose the next desired picture is (are) located (602). For example, in a case where the next desired picture includes the picture 508, the header determination system 126 may determine that the coded slice 506 composes the picture 508.

The PPS with the same pic_parameter_set_id as the coded slice(s) of the next desired picture are then located (604). For example, the header determination system 126 may determine the PPS 504, which has the same pic_parameter_set_id as the coded slice 506 (i.e., pic_parameter_set_id=0 in both cases).

The SPS with the same seq_parameter-set_id as the PPS of the next desired picture may then be located (606). For example, the header determination system 126 may determine the SPS 502, which has the same seq_parameter_set_id as the PPS 504 (i.e., set_parameter_set_id=0).

Accordingly, the SPS of the next desired picture may be sent to the decoder, or may be activated in the decoder (608). In the latter case, activation of a header may occur if the particular SPS has already been sent previously to the decoder. That is, it may not be necessary to resend that particular SPS to the decoder; rather, the decoder may only need to activate the previously-sent SPS in order to obtain the effect thereof. As one example, the header presentation system 130 may activate (or send) the SPS 502 within (to) the decoder 116.

Similarly, the PPS of the next desired picture may be sent to the decoder or activated in the decoder (610), where PPS activation would be similar to SPS activation, as just discussed. For example, the header presentation system 130 may activate (or send) the PPS 504 within (to) the decoder 116.

Finally in FIG. 6, the coded slice(s) of the next desired picture may be sent to the decoder (612). For example, the header presentation system 130 may send the coded slice 506 to the decoder 116.

Figure 7:
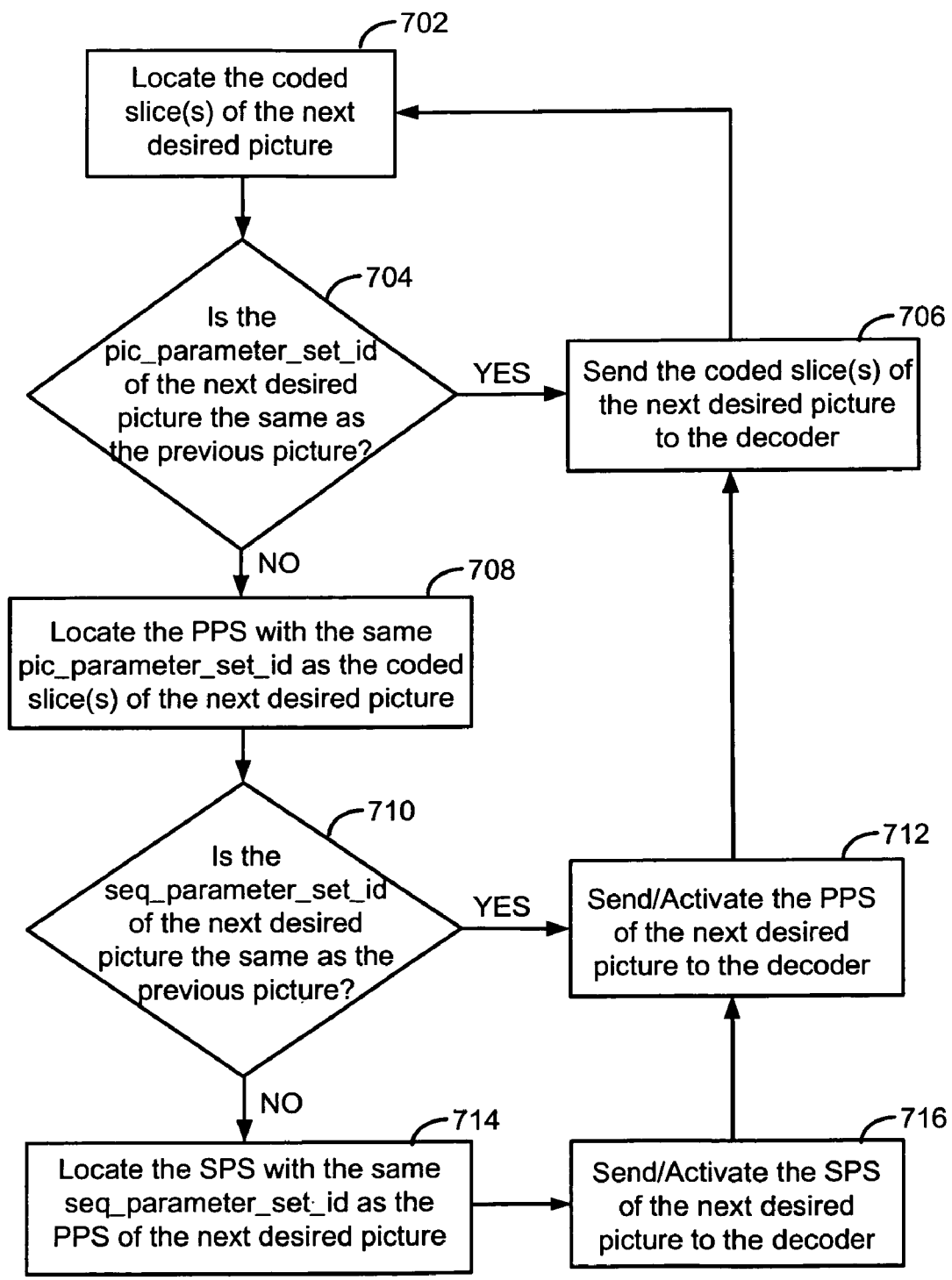
FIG. 7 is a flowchart illustrating a second example technique for using the system 100 of FIG. 1 with respect to the bitstream of FIG. 5.

FIG. 7 is a flowchart 700 illustrating a second example technique for using the system 100 of FIG. 1 with respect to the bitstream 500 of FIG. 5. As described above with respect to FIG. 6, a PPS and SPS may be sent to the decoder, or activated in the decoder, at every picture. However, the AVC syntax states that active parameters in a SPS or PPS remain in effect until another SPS or PPS is activated. Therefore, it may not be necessary to send or activate SPS or PPS header information for a picture if the header information has not changed from the previous picture. Further, since the SPS depends on the PPS, as shown in FIG. 4, there generally may be no need to check for a change in a SPS if the corresponding PPS has not changed. FIG. 7 thus illustrates techniques for taking advantage of the above aspects of the AVC syntax.

In FIG. 7, the one or more coded slices that compose the next desired picture are located (702). For example, the coded slice 526 may be located in response to a request for the picture 532.

The pic_parameter_set_id of the next desired picture may be checked for differences from the previous picture (704). If the pic_parameter_set_id is the same, then the coded slice of the next desired picture may be send to the decoder (706), and the coded slice(s) of the next desired picture may be located (702). If, however, the pic_parameter_set_id is not the same, then the PPS with the same pic_parameter_set_id as the coded slice(s) of the next desired picture may be located (708).

For example, the pic_parameter_set_id of the picture 528 may be checked to determine that its pic_parameter_set_id=2. If this identifier is the same as the pic_parameter_set_id of a previous picture (i.e., the picture most recently presented to the decoder 116, before, for example, some user request for the picture 528, where such a previous picture may or may not be one of the pictures illustrated in FIG. 5), then there is no need to re-send the PPS 524 to the decoder 116, since the PPS 524 will presumably already (still) be activated within the decoder 116. As such, the coded slice 526 of the next desired picture 528 may simply be sent to the decoder. If, however, the identifier pic_parameter_set_id=2 is different from that of the previous picture, then coded slice 526 of the next desired picture 528 may not be send directly to the decoder 116, but, rather, the PPS 524 with the same pic_parameter_set_id=2 is located by the header determination system 126.

Then, the seq_parameter_set_id of the next desired picture may be checked for differences from the previous picture (710). If there are no differences, then the PPS of the next desired picture may be sent/activated to the decoder (712), and the coded slice(s) of the next desired picture(s) may be sent to the decoder (706). If, however, the seq_parameter_set_id of the next desired picture is different from that of the previous picture, then, the SPS with the same seq_parameter_set_id as the PPS of the next desired picture may be located (714) and sent/activated to/within the decoder (716).

For example, continuing the example in which the next desired picture includes the picture 528, it may be determined that the seq_parameter_set_id=1 of the picture 528 is different from the seq_parameter_set_id of the previous picture. As a result, the header determination system 126 may then locate the SPS 522 having the (same) seq_parameter_set_id=1 of the picture 528, so that the SPS 522 may then be sent/activated to/within the decoder 116. As shown, however, if the seq_parameter_set_id is the same as the seq_parameter_set_id of the previous picture, then the PPS 524 of the next desired picture 528 may be send directly to the decoder 116 (712), followed by the coded slice 526 (706).

Systems, methods, and computer program products to determine and present decoding information, such as, for example, header information, to ensure correct and/or desired decoding in digital video recording applications, and in other applications, have been described. For example, the proper decoding and display of certain video units in a compressed bitstream (such as, for example, pictures or slices) may require the correct header information corresponding to the video unit to be also presented to the decoder along with the video unit. Since, however, the location of the corresponding header information in the compressed bitstream may not be adjacent to the video unit, the described header locating system(s) may be used to not only index the header information in a bitstream, but also to determine when and what header information needs to be presented to the decoder. As a result, for example, operations such as trick modes in digital video recording applications that require the decoding and display of pictures in a different order than the order in which they are coded in the original bitstream may be handled in an efficient, fast, and reliable manner.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:
1. A method comprising:
identifying a portion of a bitstream, the portion being provided within the bitstream and separately from associated decoding information;

determining the decoding information that is associated with the portion, including determining an identifier of the decoding information included within the portion, and thereafter determining a memory location of the decoding information within a memory, wherein the memory location is stored in association with the identifier; and providing the portion and the decoding information to a decoder, including obtaining the decoding information from the memory location for providing to the decoder.

2. The method of claim 1 wherein identifying a portion of a bitstream comprises:

identifying an audio-video unit as the portion, the audio-video unit being provided separately within the bitstream from a header that includes the related decoding information.

3. The method of claim 1 wherein determining the decoding information comprises:

analyzing the portion to determine the identifier as including a header identifier of a header that is associated with the decoding information.

4. The method of claim 1 wherein determining the decoding information comprises:

determining the identifier as including a header identifier of a header associated with the decoding information, where the portion is associated with an audio-video unit within the bitstream; and determining whether the header identifier is the same as a previous header identifier associated with a previous audio-video unit that precedes the audio-video unit in the bitstream.

5. The method of claim 1 wherein the identifier includes a header identifier of a header associated with the decoding information, and wherein determining the decoding information comprises:

locating the header within the memory, based on the header identifier.

6. The method of claim 1 wherein the identifier includes a header identifier of a header associated with the decoding information, and wherein determining the decoding information comprises:

consulting a header index to determine the memory location of the header.

7. The method of claim 1 wherein determining the decoding information comprises:

forming an index that relates a plurality of header identifiers associated with corresponding headers within the bitstream with a corresponding plurality of memory locations at which headers associated with the header identifiers are stored, wherein the header identifiers include the identifier and the headers include the decoding information, and wherein the plurality of memory locations include the memory location.

8. The method of claim 7 wherein forming the index comprises:

forming the index during either a recording of at least a part of the bitstream to the memory, and/or during a playback of at least a part of the bitstream from the memory.

9. The method of claim 1 wherein determining the decoding information comprises:

determining the decoding information as including display information provided either within or separately from the bitstream, and that is related to a display option for display of the portion.

10. The method of claim 1 wherein providing the portion and the decoding information to a decoder comprises:

sending the decoding information to the decoder and/or activating the decoding information within the decoder.

11. A system comprising:

an index that is operable to associate an identifier with a location of decoding information, the decoding information related to decoding of a portion of a bitstream;

a determination system that is operable to analyze the portion of the bitstream to determine the identifier, and that is further operable to access the index to determine the location of the decoding information, based on the identifier; and a presentation system that is operable to provide the portion and the decoding information to a decoder.

12. The system of claim 11 comprising:

an indexing system that is operable to form at least a portion of the index from the bitstream.

13. The system of claim 11 wherein the decoding information is included within the bitstream, and wherein the location of the decoding information includes the location of the decoding information within a bitstream memory that is operable to store at least a portion of the bitstream.

14. The system of claim 11 wherein the index stores a location and size of the decoding information within a memory.

15. The system of claim 11 wherein decoding information includes a header that is located separately from the portion within the bitstream.

16. An apparatus comprising a storage medium having instructions stored thereon, the instructions including:

a first code segment for accessing content from within a bitstream;

a second code segment for determining decoding information associated with the content, the decoding information being located separately from the content, including determining an identifier of the decoding information included within the content, and thereafter determining a memory location of the decoding information within a memory, wherein the memory location is stored in association with the identifier; and a third code segment for presenting the decoding information to a decoder for use in decoding the content, including obtaining the decoding information from the memory location for providing to the decoder.

17. The apparatus of claim 16 wherein the first code segment accesses the content in a different sequence than the content was encoded within the bitstream.

18. The apparatus of claim 16 wherein the identifier includes a header identifier of a header associated with the decoding information, and wherein the second code segment includes:

a fourth code segment for analyzing the content to determine the header identifier; and a fifth code segment for determining the decoding information, based on the header identifier.

19. The apparatus of claim 16 comprising:

a fourth code segment for generating an index in which identifiers of decoding information are associated with memory locations of associated decoding information, where the second code segment is for determining the decoding information from the index, and wherein the identifiers include the identifier and the memory locations include the memory location.

* * * * *